Aug. 25, 1953  K. ZEILER ET AL  2,650,079
MIXING KETTLE FOR CHEESE CURD
Filed Nov. 15, 1950
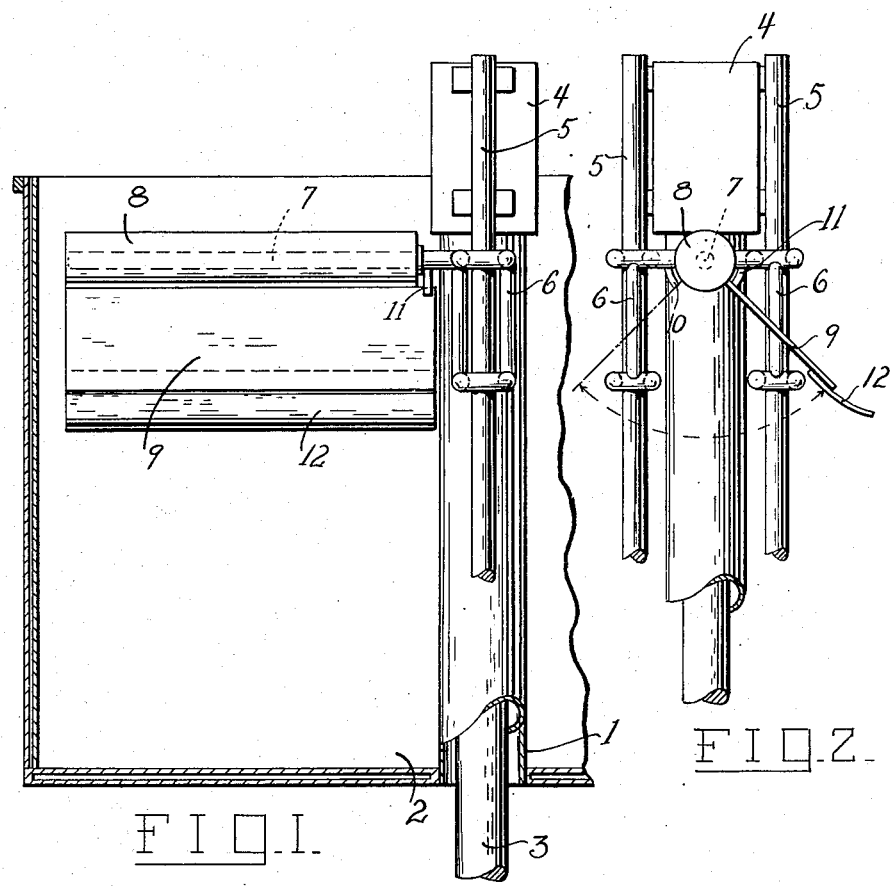
INVENTORS:
KARL ZEILER
KONRAD LENZ
BY
Richardson, David and Nordon Patented Aug. 25, 1953

2,650,079

UNITED STATES PATENT OFFICE 2,650,079

MIXING KETTLE FOR CHEESE CURD

Karl Zeiler and Konrad Lenz, Freising, Germany, assignors to Anton Steinecker Maschinenfabrik A. G., Freising, Germany, a firm Application November 15, 1950, Serial No. 195,716
In Germany February 3, 1950

1 Claim. (Cl. 259—101)

The present invention pertains to mixing kettles for gently stirring the curd used in cheese-making, the curd having previously been cut in pieces in a cutting frame. In the manufacture of cream cheese, the stirring operation must be carried out very gently in order to avoid breaking up the pieces of curd which are very sensitive to mechanical stress.

Among the objects of the invention, is the accomplishment of the above task.

The mixing kettle of the invention comprises an oscillating shaft extending upwardly in the kettle above the level of the curd to be mixed, and a horizontally extending arm which is mounted on a vertically movable frame, the frame being arranged for movement with the oscillating shaft. A float, which is supported by the curd, is freely rotatably mounted on the arms and carries with it an oscillating pivotally mounted stirring blade member whose angular displacement as it engages the curd is limited by two stops, one for each direction of rotation of the oscillating shaft. The stirring blade as it engages the curd is thereby obliquely positioned with respect to the vertical, thus assuring a gentle agitation of the curd.

The stirring blade is formed either wholly or partly from a resilient material, such as rubber, so that a flexible flap is provided which yields during stirring engagement of the blade with the curd.

Other objects and advantages of the invention will become apparent upon reading the following specification, together with the accompanying drawing forming a part hereof.

Referring to the drawing:

Figure 1 is a fragmentary view of an embodiment of the invention showing the stirring blade in elevation.

Figure 2 is a fragmentary view of the embodiment of Figure 1, showing an end view of the stirring blade.

Referring to Figure 1, a fixed tube 1 extends vertically upwardly in the center of a mixing kettle 2. An oscillating drive shaft 3, which is driven from below by any desired means, such as an electric motor (not shown), extends upwardly within the tube 1, being rotatable therein. At its upper end, the drive shaft 3 is provided with a head 4 which extends laterally beyond the tube 1 and which is fixed to drive shaft 3 for oscillation therewith. Downwardly extending guide rods 5 are fixedly secured to opposite sides of the oscillating head 4, and a vertically movable supporting frame 6 engages the guide rods 5 for oscillation therewith, frame 6 having holes formed therein for passage therethrough of the guide rods 5. Supporting frame 6 carries a horizontally extending arm 7 which oscillates about the vertical axis of the drive shaft 3, with the head 4. The horizontal arm 7, in turn, carries a freely rotatable hollow cylindrical float 8 which is supported on the surface of the curd by its own bouyancy. A plate 9 is pivoted on arm 7, being carried by the rotatable float 8, and extends downwardly therefrom, its pivotal movement about the horizontal axis of arm 7 being restricted by two symmetrically arranged stops 10 and 11 to two equal and opposite angles from the vertical. The lower portion of the stirring blade consists of a strip 12 of flexible material such as rubber secured to the lower edge of plate 9 to form a flexible flap portion for the stirring blade.

In operation, shaft 3 oscillates head 4 which is attached thereto, and head 4 in turn oscillates the vertically movable frame 6 through the downwardly extending guide rods 5. This causes oscillation of horizontally extending arm 7 secured to frame 6 and of the rotatable float 8. Plate 9 with its flexible flap 12 is dragged through the curd, and being pivotally supported from horizontal arm 7 by the rotatable float 8, it will tend to assume a horizontal aspect by reason of its stirring engagement with the curd in the kettle 2, but the turning movement of plate portion 9 of the stirring blade (9, 12) is limited either by stop 10 or stop 11, depending upon the direction of rotation of the oscillating drive shaft 3, so that it stirs the curd while in an oblique position, thus providing a more gentle stirring action. The stirring action is further rendered more gentle by the resiliency of the flap portion 12 of the stirring blade. The float 8 follows variations in the level of the partially liquid mass of the curd and adjusts the stirring blade (9, 12) accordingly.

In the claim:

A mixing kettle for stirring a partially liquid mass, said kettle comprising: a tube extending vertically upwardly within the kettle; an oscillatable drive shaft rotatable within said tube; head means fixed to said drive shaft at the upper end thereof for oscillation therewith; guide means carried by said head for oscillation therewith; vertically movable supporting means engaging said guide means; a horizontally extending supporting arm carried by said frame; float means freely rotatably mounted on said arm for vertical displacement thereof; a stirring blade connected to said float for oscillation therewith, said stirring blade comprising a downwardly extending upper plate portion and a lower flexible flap portion, said pivotal connection causing said stirring blade to be angularly displaceable about a horizontal axis; and stop means carried by said frame and engageable with said stirring blade for limiting said angular displacement to two opposite angles from the vertical whereby said stirring blade will be dragged through said liquid by said oscillating arm and will be angularly displaced through one of said angles into an oblique position by stirring engagement therewith, said oblique position being determined by engagement of said blade with said stop means.

KARL ZEILER.
KONRAD LENZ.

References Cited in the file of this patent

UNITED STATES PATENTS

| Number | Name | Date |
|---|---|---|
| 1,737,421 | Hirschy | Nov. 26, 1929 |
| 1,739,405 | Marsh | Dec. 10, 1929 |
| 1,954,518 | Downer | Apr. 10, 1934 |